US011820417B2

(12) United States Patent
Yuan

(10) Patent No.: US 11,820,417 B2
(45) Date of Patent: Nov. 21, 2023

(54) STROLLER SUPPORTING FRAME NOISE REDUCTION STRUCTURE

(71) Applicant: WONDERLAND SWITZERLAND AG, Steinhausen (CH)

(72) Inventor: Jialiang Yuan, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/499,381

(22) Filed: Oct. 12, 2021

(65) Prior Publication Data

US 2022/0111883 A1    Apr. 14, 2022

(30) Foreign Application Priority Data

Oct. 13, 2020   (CN) .......................... 202022279248.X

(51) Int. Cl.
*B62B 9/18*   (2006.01)

(52) U.S. Cl.
CPC ............ *B62B 9/18* (2013.01); *B62B 2301/20* (2013.01)

(58) Field of Classification Search
CPC .... B62B 9/18; B62B 9/28; B62B 9/00; B62B 9/12; B62B 9/185; B62B 2301/00; B62B 2301/20; B62B 2301/08; B62B 5/0009; B62B 5/087

See application file for complete search history.

(56) References Cited

U.S. PATENT DOCUMENTS

| 6,422,634 B2 * | 7/2002 | Lundh ...................... B62B 9/28 296/97.21 |
| 6,851,693 B2 * | 2/2005 | Haeggberg ............... B62B 9/28 280/647 |

(Continued)

FOREIGN PATENT DOCUMENTS

| CN | 200999058 Y | 1/2008 |
| CN | 102452407 A | 5/2012 |

(Continued)

OTHER PUBLICATIONS

Chinese Office Action for Application No. 202110865967.6 dated Sep. 16, 2022.

(Continued)

*Primary Examiner* — James M Dolak
(74) *Attorney, Agent, or Firm* — Volpe Koenig

(57) ABSTRACT

The disclosure provides a noise reduction structure comprising a stroller frame, a supporting frame connected to the stroller frame, and a wheel mounted on the supporting frame, the supporting frame receive a force so that the wheel contacts a supporting surface to slide; and an elastic resetting member is arranged between the supporting frame and the stroller frame, the resetting member always has a tendency to bring the supporting frame to reset. The noise reduction structure of the disclosure has a simple structure and is suitable for baby strollers or hand carts. By additionally arranging a resetting member between the supporting frame and the stroller frame, the supporting frame always has a resetting tendency, that is, when the supporting frame is unloaded, the resetting member may suspend the wheel, so as to avoid noise caused by friction between the wheel and the supporting surface.

20 Claims, 7 Drawing Sheets

(56) References Cited

U.S. PATENT DOCUMENTS

| | | | | |
|---|---|---|---|---|
| 6,981,709 B2* | 1/2006 | Saint | ............ | B62B 9/02 |
| | | | | 280/47.38 |
| 7,581,737 B2* | 9/2009 | Cousin | ............ | B62B 9/28 |
| | | | | 280/63 |
| 8,006,786 B1* | 8/2011 | Chapman | ............ | A61G 5/1094 |
| | | | | 280/32.7 |
| 8,128,103 B1* | 3/2012 | Schutzendorf | ............ | B62B 7/008 |
| | | | | 280/47.38 |
| 8,146,936 B2* | 4/2012 | Lai | ............ | B62B 5/087 |
| | | | | 280/288.4 |
| 9,545,941 B2* | 1/2017 | Pacella | ............ | B62B 7/145 |
| 9,616,912 B2* | 4/2017 | Haut | ............ | B62B 7/14 |
| 10,077,063 B2* | 9/2018 | Haut | ............ | B62B 9/28 |
| 10,220,869 B1* | 3/2019 | Shamie | ............ | B62B 7/08 |
| 10,322,739 B2* | 6/2019 | Liu | ............ | B62B 5/087 |
| 10,683,025 B2* | 6/2020 | Chaudeurge | ............ | B62B 5/08 |
| 10,703,399 B2* | 7/2020 | Ostergaard | ............ | B62B 3/008 |
| 11,505,230 B1* | 11/2022 | Cardentey | ............ | B62B 9/28 |
| 2001/0013688 A1* | 8/2001 | Warner, Jr. | ............ | B62B 7/08 |
| | | | | 280/47.38 |
| 2008/0088115 A1* | 4/2008 | Yang | ............ | B62B 9/28 |
| | | | | 280/642 |
| 2010/0066058 A1* | 3/2010 | Norcia | ............ | B62B 9/00 |
| | | | | 280/642 |

FOREIGN PATENT DOCUMENTS

| | | |
|---|---|---|
| CN | 205686454 U | 11/2016 |
| CN | 106428165 A | 2/2017 |
| CN | 107972719 A | 5/2018 |
| DE | 20213848 U1 | 11/2022 |
| TW | M404809 U1 | 6/2011 |
| WO | 9416929 A1 | 8/1994 |

OTHER PUBLICATIONS

Office Action issued in counterpart Taiwan Patent Application No. 110137803 dated Jan. 9, 2023.

* cited by examiner

STROLLER SUPPORTING FRAME NOISE REDUCTION STRUCTURE

CROSS-REFERENCE TO RELATED APPLICATION

The present application is based on and claims the benefit of and priority to Chinese Patent Application No. 202022279248.X, filed on Oct. 13, 2020, the entire contents of which is incorporated herein by reference.

TECHNICAL FIELD

The disclosure relates to baby products, and particularly to a noise reduction structure.

BACKGROUND

At present, most baby strollers may only be used by one stroller for one child. When the child wants to stand up, the existing baby stroller cannot satisfy his requirement. Especially, if a family has two children, one baby-sitter cannot use two strollers. Moreover, older children need to stand more. In order to satisfy the above-mentioned needs, some baby strollers are provided with a supporting frame at their tails for children to stand or for placing goods. The bottom of the supporting frame is provided with auxiliary wheels for assisting driving. The friction between the auxiliary wheels and the ground will produce a certain amount of noise. If there is no need to use the supporting frame, the auxiliary wheels still generate noise due to their contact and friction with the ground. In some baby strollers, their supporting frames are arranged as foldable, i.e., they are put down in use, and fold up when not in use. However, frequent folding and turning will shorten their lifespan, and there will be health hazards for turning the supporting frames by hand, which is not convenient for the baby-sitters to take care of the babies.

Therefore, there is an urgent need for a noise reduction structure which is simple in structure, and can automatically rise when the supporting frame is unloaded so to avoid friction between the auxiliary wheels and the ground.

SUMMARY

An object of the disclosure is to provide a noise reduction structure which is simple in structure, and can automatically suspend the auxiliary wheels when the supporting frame is unloaded.

In order to achieve the above object, the disclosure provides a noise reduction structure comprising a stroller frame, a supporting frame connected to the stroller frame, and a wheel mounted on the supporting frame, the supporting frame receive a force so that the wheel mounted on the supporting frame contacts a supporting surface to slide; and an elastic resetting member is arranged between the supporting frame and the stroller frame, the resetting member always has a tendency to bring the supporting frame to reset, so that the supporting frame brings the wheel to rise to avoid a friction between the wheel and the supporting surface to generate noise.

Compared with the related art, the noise reduction structure of the disclosure may comprise a stroller frame and a supporting frame. A bottom of the supporting frame is provided with a wheel for sliding. The supporting frame would act on the wheel if receive a force, and drive the wheel to move downward to contact the supporting surface to slide. An elastic resetting member may be arranged between the supporting frame and the stroller frame. When the force on the standing plate is removed, the resetting member may bring the supporting frame to perform a resetting movement upward, so as to bring the wheel to rise, thereby avoiding noise generated due to the friction between the wheel and the supporting surface when the supporting frame is unloaded. The noise reduction structure of the disclosure has a simple structure, moreover, by adding one resetting member between the supporting frame and the stroller frame, the supporting frame always has a resetting tendency, that is, when the supporting frame is unloaded, the resetting member may suspend the wheel, so as to avoid the friction between the wheel and the supporting surface to generate noise.

Preferably, an elastic stretching member is also arranged between the stroller frame and the supporting frame, the stretching member has a first elastic force to downwardly stretch the supporting frame, such that the wheel mounted on the supporting frame moves downward and contact the supporting surface. By arranging the elastic stretching member between the stroller frame and the supporting frame, the structure between the stroller frame and the supporting frame will be more stable and will not shake.

Specifically, the resetting member has a second elastic force to upwardly stretch the supporting frame, and the second elastic force is greater than the first elastic force. In case that the resetting member on the supporting frame has an upward stretching force, and the stretching member has a downward stretching force, only the upward force is greater than the downward force, the wheel may be lifted upward, thereby avoiding friction between the wheel and the supporting surface to generate noise.

Preferably, a standing plate is also arranged on the supporting frame, the standing plate receives a force and acts on the supporting frame, such that the wheel mounted on the supporting frame contact the supporting surface to slide. The standing plate may be used for a child to stand or for placing goods, such structure is simple, and it is convenient to use.

Preferably, the standing plate is detachably mounted on the supporting frame.

Preferably, a fixing member is arranged on the stroller frame for fixing the supporting frame. The supporting frame is on stroller frame through the fixing member mounted.

Preferably, a mounting rod is also arranged on the stroller frame, one end of the mounting rod is mounted on the stroller frame, and the other end of the mounting rod is connected to the fixing member. Accordingly, the stroller frame and the supporting frame may be connected and fixed at multiple locations, such that the structure is more stable.

Preferably, the fixing member is provided with a protrusion part protruding in a first direction, a through slot is arranged on the protrusion part for the mounting rod to pass through, and the standing plate receive a force so that the fixing member slides along the mounting rod at the through slot. When the standing plate receives a force or the force on the standing plate is removed, the fixing member will have a downward or upward movement tendency. The mounting rod is fixed on the stroller frame, and the fixing member moves back and forth along the mounting rod when the standing plate moves. Accordingly, by arranging a limit nut at an end of the mounting rod, the fixing member may be prevented from sliding out of the mounting rod during sliding.

Preferably, an end of the mounting rod close to the resetting member is provided with a limit nut for limiting location.

Preferably, the resetting member passes through and is mounted on the mounting rod and is located between the limit nut and the fixing member, the standing plate receive a force so that the fixing member compresses the resetting member. The elastic resetting member is arranged between the limit nut and the fixing member, the standing plate will move downward when a force is applied thereon, so as to bring the fixing member to slide along the mounting rod, thereby compressing resetting member; and when force on the standing plate is removed, the compressed resetting member rebounds to reset.

Preferably, a mounting member is arranged on the stroller frame for mounting the supporting frame, and one end of the mounting member is provided with a mounting part for the mounting rod to pass through and be mounted. The standing plate may be arranged on the mounting member, and the mounting rod is mounted on the mounting member and connected to the fixing member, so that if the standing plate receive a force, the mounting rod, the fixing member and the supporting frame all receive the force from the standing plate.

Preferably, an end of the mounting rod close to the mounting member is provided with a fixing part, and the mounting rod is prevented from being separated from the mounting member in moving by the fixing part.

Preferably, the end of the mounting rod close to the mounting member is further provided with a mounting hole, the mounting member is provided with a first through hole being close to the mounting part, the stroller frame is provided with a second through hole being coaxial with the first through hole, and the mounting member further includes a connecting member passing through the mounting hole, the first through hole and the second through hole in sequence and fixing the mounting rod and the mounting member to the stroller frame. By fixing the mounting rod and the mounting member to the stroller frame through the hole and the screw arbor, the structure is stable.

Preferably, the fixing member is further provided with a connecting part for connecting the stroller frame and the supporting frame, the connecting part includes a top wall and a bottom wall being arranged opposite to each other, the top wall and the bottom wall are connected to each other by a side wall, the side wall is arranged in a curved surface, and the stroller frame is mounted between the top wall and the bottom wall and abuts against the side wall. The stroller frame and the supporting frame are connected together by the fixing member, such structure of the fixing member being arranged reasonable.

Preferably, the supporting frame is mounted between the top wall and the bottom wall along a second direction and protrudes out of the fixing member. Furthermore, one end of the supporting frame is arranged in the fixing member, and the supporting frame is connected to stroller frame through the fixing member.

Preferably, an end of the top wall close to the side wall is provided with a first limit block for limiting a sliding of the supporting frame in a second direction, and an end of the bottom wall close to the side wall is provided with a second limit block for limiting the sliding of the stroller frame in the second direction. Since the supporting frame often receive a force to slide, by arranging the first limit block and the second limit block in the fixing member, the supporting frame may be prevented from directly acting on the stroller frame during sliding, thereby prolonging the service life of the stroller frame, and preventing the stroller frame from damage due to friction.

Preferably, the resetting member includes a spring structure. The spring structure is a simple structure, which is compressed under a force, and can rebound quickly after the force is removed.

Preferably, the stretching member is a tension spring. The tension spring has a simple and stable structure.

Preferably, the stroller frame is a stroller frame for a baby stroller or a hand cart. Hand carts such as baby strollers or shopping carts are all are suitable for the aforementioned noise reduction structure.

DETAILED DESCRIPTION

Figure 1:
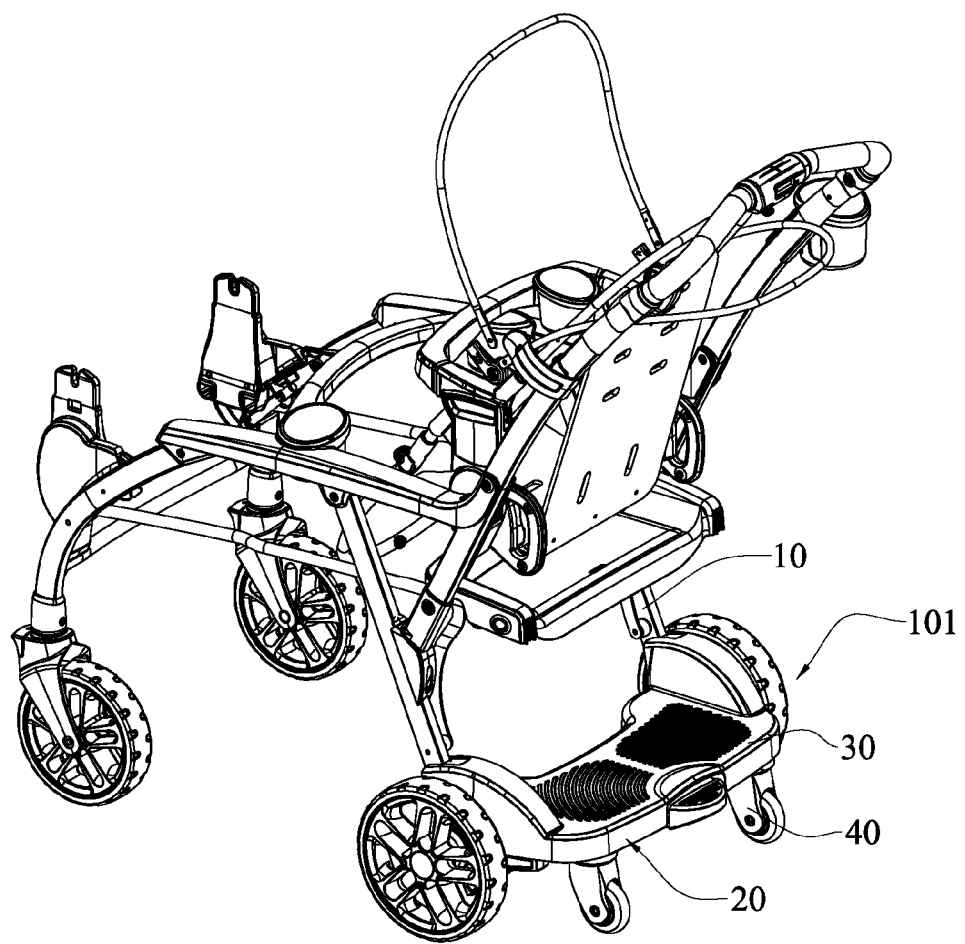
FIG. 1 is a schematic structural view of a baby stroller provided with a noise reduction structure according to the disclosure.
Figure 2:
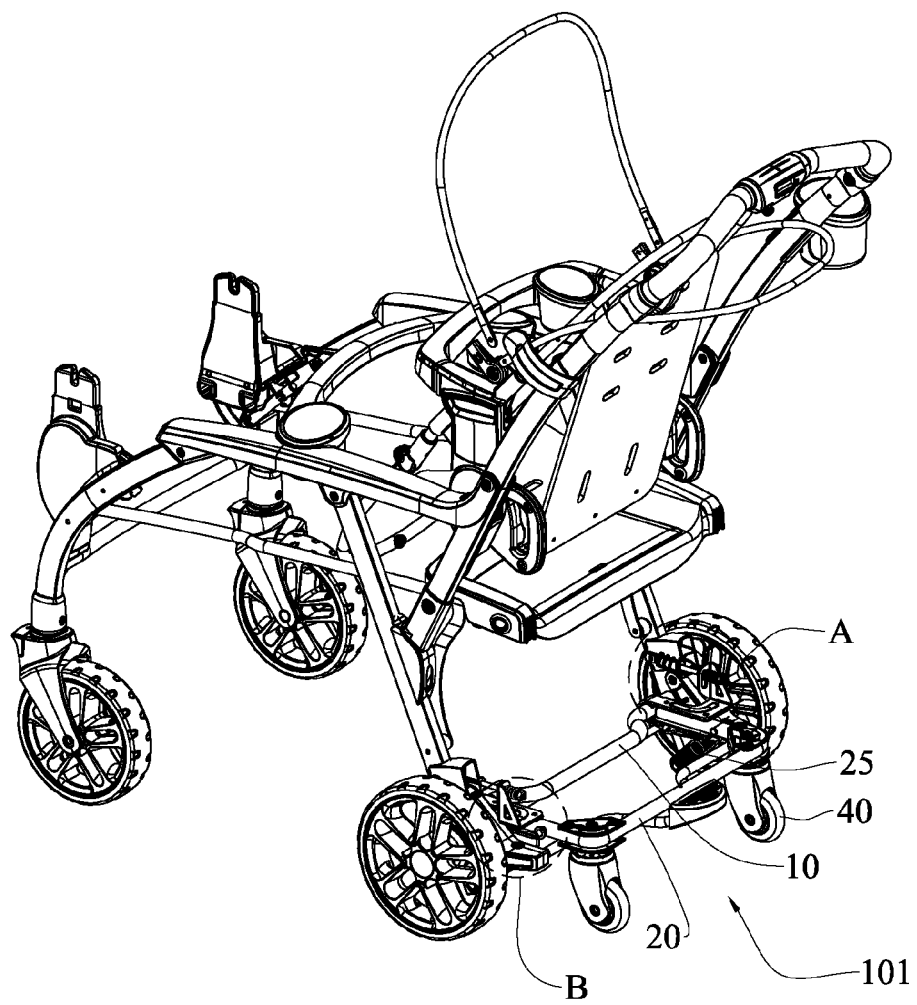
FIG. 2 is a schematic view of an internal structure of the noise reduction structure in FIG. 1 after removing of a standing plate.

In order to describe the technical content and structural features of the disclosure in detail, the following illustration is provided conjunction with the embodiments and the accompanying drawings.

Referring to FIGS. 1 to 5, the disclosure provides a carrier 100. The carrier 100 has a noise reduction structure 101. The noise reduction structure 101 comprises a stroller frame 10, a supporting frame 20 connected to the stroller frame 10, and a wheel 40 mounted on the supporting frame 2. In this embodiment, the carrier 100 may be a hand cart such as a baby stroller, a shopping cart and the like. In other words, the stroller frame 10 may be a frame for a baby stroller, or any other kind of hand carts. When a force is applied to the supporting frame 20, the wheel 40 mounted on the supporting frame 20 will contact a supporting surface to slide, and the supporting surface may be the ground or the like. Specifically, an elastic resetting member 22 is arranged between the supporting frame 20 and the stroller frame 10, and the resetting member 22 always has a tendency to reset the supporting frame 20, such that the supporting frame 20 lifts the wheel 40, so as to avoid the friction between the wheel 40 and the supporting surface to generate noise. It would be understood, when the supporting frame 20 is unloaded, due to the gravity of the supporting frame 20 and the wheel 40, there will be a downward tendency to cause the wheel 40 and the supporting surface to contact each other and thus generating friction and noise. Since the resetting member 22 is arranged between the stroller frame 10 and the supporting frame 20, the supporting frame 20 may be lifted and bring the wheel 40 to rise, so as to avoid the friction between the wheel 40 and the supporting surface and the noise generated by the friction.

After the above technical solution is adopted, due to the noise reduction structure 101 of the disclosure, the elastic resetting member 22 is arranged between the stroller frame 10 and the supporting frame 20, the resetting member 22 is reset to bring the supporting frame 20 to move upward, and then the supporting frame 20 brings the wheel 40 to rise so as to avoid the friction between the wheel 40 and the supporting surface to generate noise. On the bottom of the supporting frame 20, the wheel 40 for auxiliary support and for sliding is provided. If the supporting frame 20 receive a force, it will act on the wheel 40, and drive the wheel 40 to move downward to contact the supporting surface to slide, while the wheel 40 can play a role of support and sliding. The elastic resetting member 22 is arranged between the supporting frame 20 and the stroller frame 10, so, when the force on the supporting frame 20 is removed, the resetting member 22 may bring the supporting frame 20 to perform an upward resetting movement, thereby bringing the wheel 40 to rise, and in turn, avoiding noise generated from the friction between the wheel 40 and the supporting surface while the supporting frame 20 is unloaded. The noise reduction structure 101 according to the disclosure is simple in structure. By adding a resetting member 22 between the supporting frame 20 and the stroller frame 10, so that the supporting frame 20 always has a resetting tendency, i.e., when the supporting frame 20 is unloaded, the resetting member 22 may bring the supporting frame 20 to rise and drive the wheel 40 to rise, so the wheel 40 is suspended, and noise generated from the friction between the wheel 40 and the supporting surface is avoided.

Referring to FIG. 1, a standing plate 30 is also arranged on the supporting frame 20. The standing plate 30 may receive a force and acts on the supporting frame 20, so that the wheel 40 mounted on the supporting frame 20 may contact the supporting surface to slide. The standing plate 30 may be detachably mounted on the supporting frame 20. The standing plate 30 is arranged on the supporting frame 20, which can be used better for children to stand or storing objects, and which has a simple structure and is convenient for use. It would be understood, when a child stands on the standing plate 30, or a heavy object is placed on the standing plate 30, the force applied on the standing plate 30 may act on the supporting frame 20 and drive the wheel 40 to move downward to contact the supporting surface to slide, while the wheel 40 can play a role of support and slide. When the standing plate 30 is unloaded, the resetting member 22 may cause the supporting frame 20 to rise and bring the wheel 40 to rise, such that the wheel 40 is suspended, so as to avoid friction between the wheel 40 and the supporting surface to generate noise. Referring to FIGS. 2 to 7, in some optional embodiments, an elastic stretching member 25 is arranged between the stroller frame 10 and the supporting frame 20. The stretching member 25 has a first elastic force which downwardly stretches the supporting frame 20, such that the wheel 40 mounted on the supporting frame 20 moves downward and contact the supporting surface. The stretching member 25 which may downwardly stretches and has an elasticity is arranged between the stroller frame 10 and the supporting frame 20, so the stroller frame 10, the supporting frame 20 and the stretching member 25 are in a triangular structure. By the arrangement of the stretching member 25, the structure between the stroller frame 10 and the supporting frame 20 may be more stable and will not shake. Specifically, the resetting member 22 has a second elastic force which will upwardly stretch the supporting frame 20, and the second elastic force is greater than the first elastic force. The resetting member 22 on the supporting frame 20 has a stretching force to upwardly stretch the supporting frame 20, and the stretching member 25 has a stretching force to downwardly stretch the supporting frame 20. Only when the upward force is greater than the downward force, can the wheel 40 be lifted upward, so as to avoid the friction between the wheel 40 and the supporting surface to generate noise. It would be understood, when a force is applied on the standing plate 30, the supporting frame 20 and the fixing member 21 may have a downward movement tendency, and bring the fixing member 21 to slide along the mounting rod 23 to compress the resetting member 22. The fixing member 21 converts the force in the vertical direction into the force in the horizontal direction, that is, the downward force of the standing plate 30 is converted into the force in the horizontal direction to drive the fixing member 21 to slide along the mounting rod 23. At this time, the resetting member 22 is compressed between the fixing member 21 and the limit nut 234 and energy is stored therein. If the standing plate 30 is unloaded, the stretching member 25 still has the force to downwardly stretch the supporting frame 20, such that the entire supporting frame 20 is structurally stable without shaking. Since the second elastic force stored by compression in the resetting member 22 is greater than the first elastic force of the stretching member 25 for downwardly the stretching supporting frame 20 and the sum of the gravity of the standing plate 30, the supporting frame 20 and the wheel 40. Therefore, the second elastic force of the resetting member 22 may drive the supporting frame 20 to rise, and drive the wheel 40 to rise, so as to avoid the friction between the wheel 40 and the supporting surface to generate noise.

Figure 3:
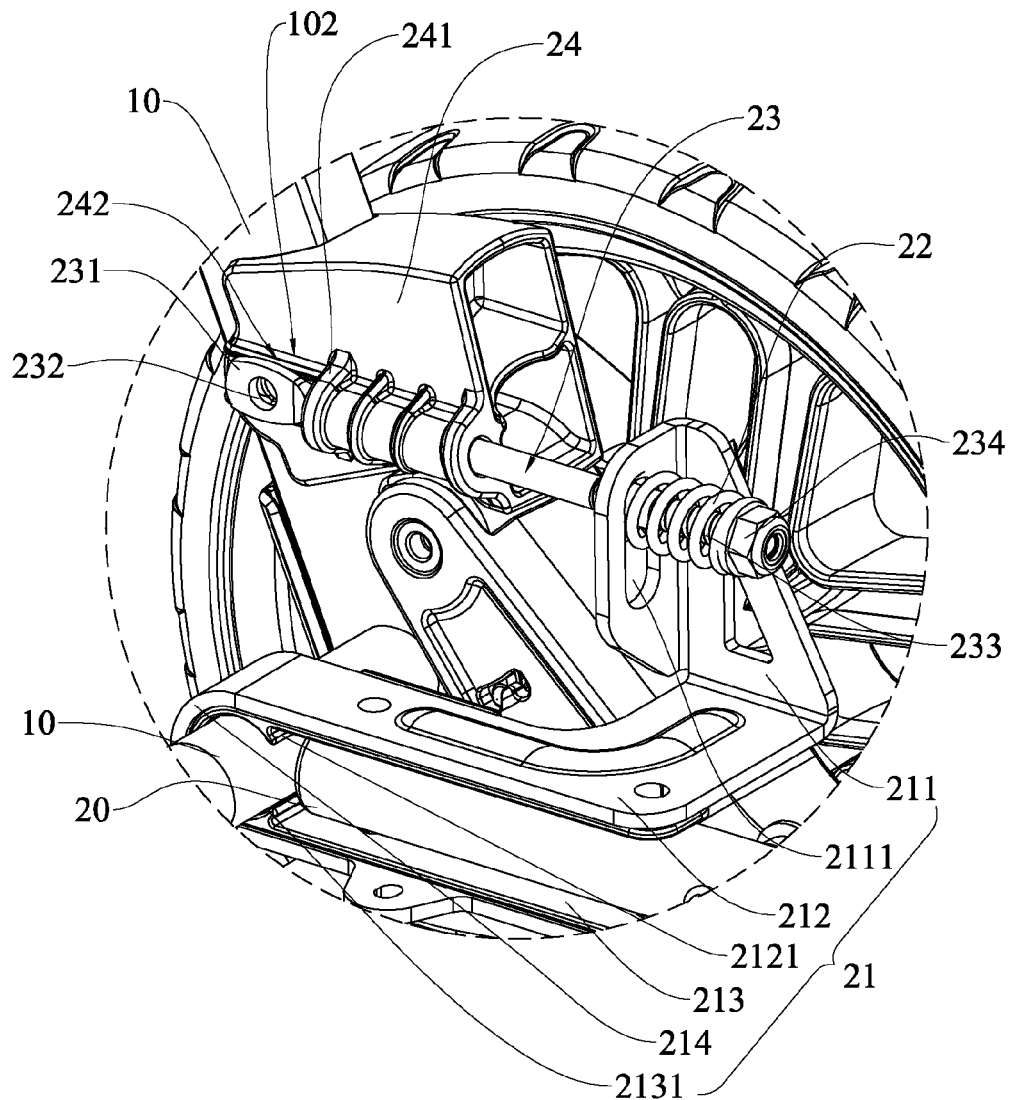
FIG. 3 is an enlarged view of part A in FIG. 2.
Figure 4:
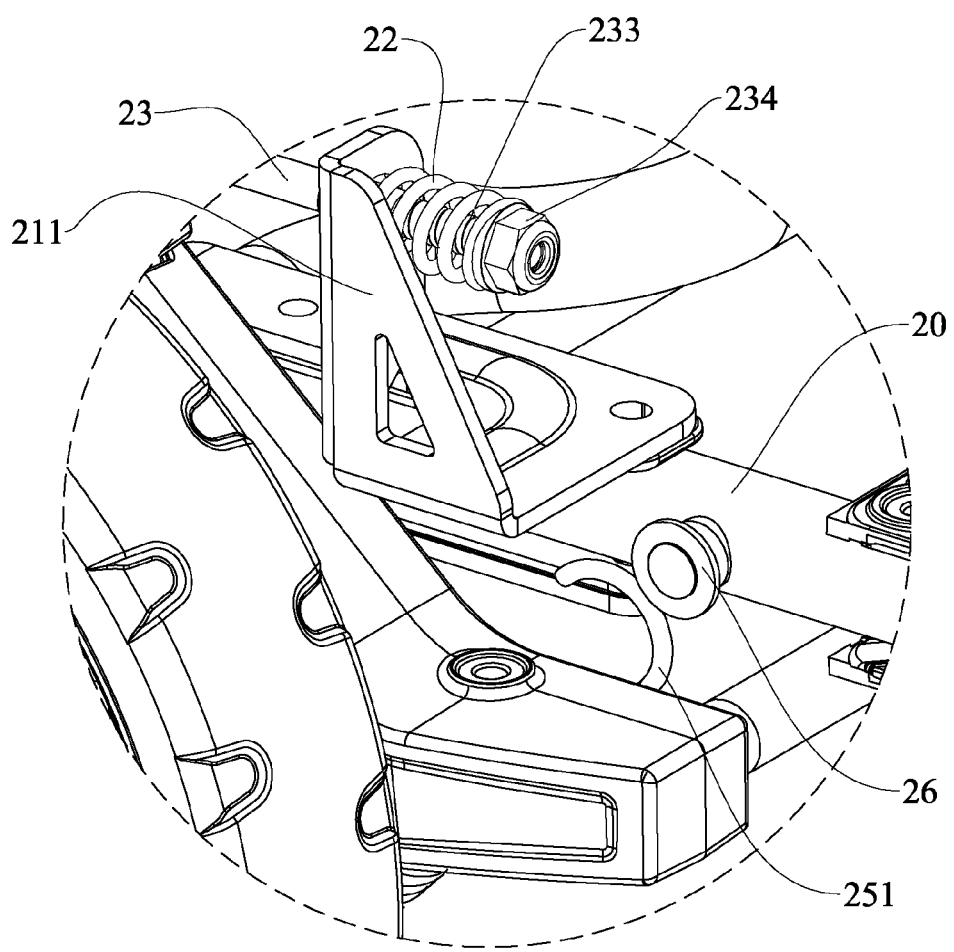
FIG. 4 is an enlarged view of part B in FIG. 2.
Figure 5:
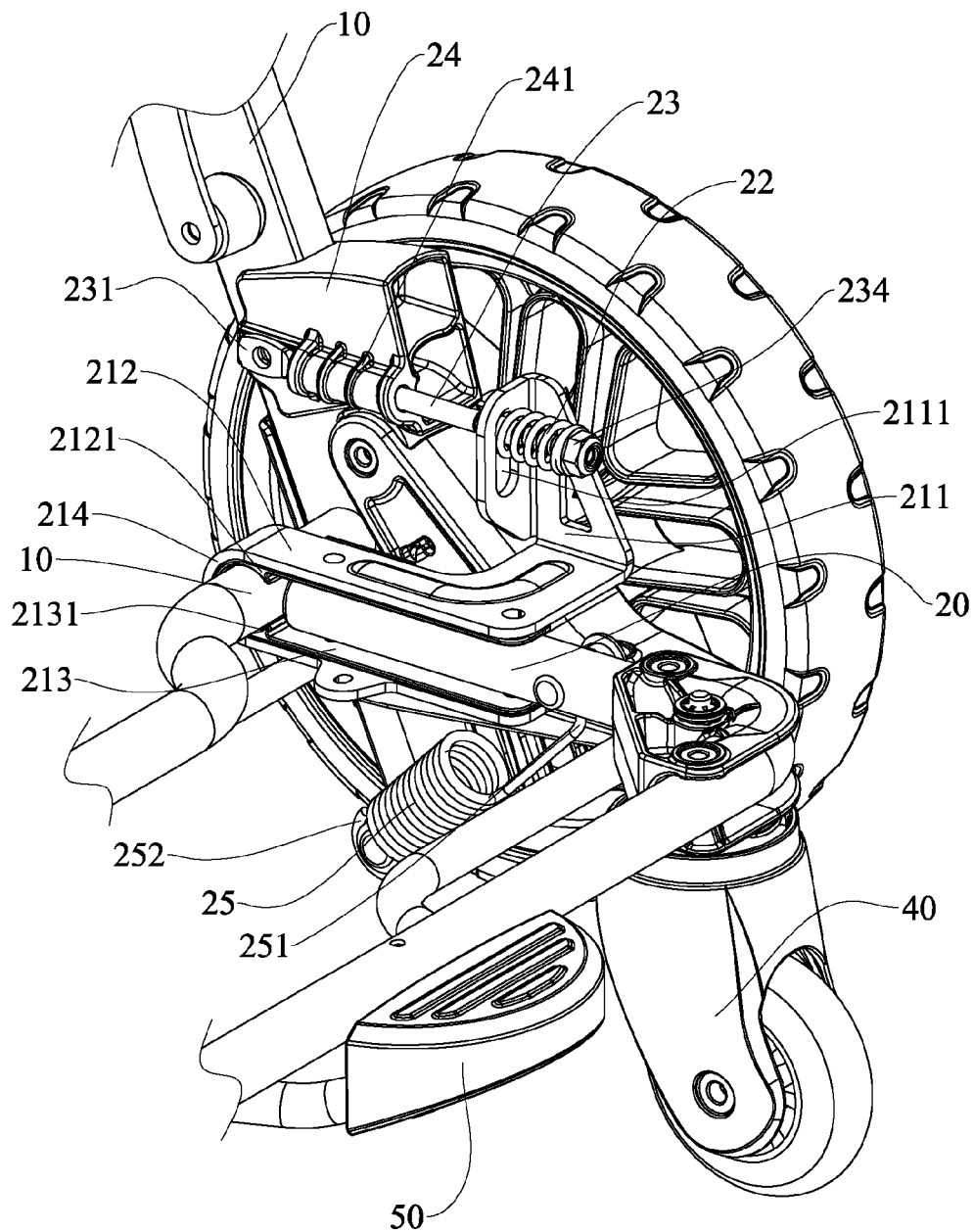
FIG. 5 is a schematic partial structural view of the noise reduction structure in FIG. 2.

Referring to FIGS. 3 to 5, in some optional embodiments, the noise reduction structure 101 further includes a fixing member 21, a mounting rod 23 and a mounting member 24. The fixing member 21 is used to connect and fix the stroller frame 10 and the supporting frame 20. The mounting member 24 is arranged on the stroller frame 10 and used for mounting the standing plate 30. One end of the mounting rod 23 is arranged on the mounting member 24, and the other end of the mounting rod 23 is arranged on the fixing member 21. Specifically, the fixing member 21 is provided with a protruding protrusion part 211 in a first direction, and a through slot 2111 is arranged on the protrusion part 211 for the mounting rod 23 to pass through. The mounting rod 23 is provided with a limit nut 234 for limiting at the end close to the through slot 2111, and the mounting rod 23 is further provided with a threaded part 233 at the end for cooperating with the limit nut 234. The limit nut 234 located at the end of the mounting rod 23 may prevent the fixing member 21 from sliding out of the mounting rod 23 during sliding. When a force is applied on the standing plate 30, the fixing member 21 slides along the mounting rod 23 at the through slot 2111. Moreover, the resetting member 22 passes through and is mounted on the mounting rod 23 and is located between the limit nut 234 and the fixing member 21, if a force is applied on the standing plate 30 so that the fixing member 21 slides and compresses the resetting member 22 through the protrusion part 211. That is, when a force is applied on the standing plate 30, the fixing member 21 will have a tendency to move downward, and tendency to move downward will be converted into a horizontal movement and the resetting member 22 will be correspondingly compressed. When the force on the standing plate 30 is removed, the fixing member 21 will have a tendency to return upward to release the compressed resetting member 22, thereby bringing the supporting frame 20 and the wheel 40 to rise, so as to prevent the wheel 40 from generating noise by contacting the supporting surface. In addition, the fixing member 21 is also provided with a connecting part for connecting the stroller frame 10 and the supporting frame 20. The connecting part includes a top wall 212 and a bottom wall 213 arranged opposite to each other. The top wall 212 and the bottom wall 213 are connected by a side wall 214. The side wall 214 is arranged in a curved surface, and the stroller frame 10 is mounted between the top wall 212 and the bottom wall 213 and abuts against the side wall 214. Moreover, the supporting frame 20 is mounted between the top wall 212 and the bottom wall 213 along a second direction and protrudes out of the fixing member 21. The top wall 212 is provided at an end close to the side wall 214 with a first limit block 2121 for limiting the sliding of the stroller frame 10 in a second direction, and the bottom wall 213 is provided at an end close to the side wall 214 with a second limit block 2131 for limiting the sliding of the stroller frame 10 in the second direction. Since the supporting frame 20 often slides due to a force applied thereon, and the supporting frame 20 is connected to the stroller frame 10, a first limit block 2121 and a second limit block 2131 are arranged in the fixing member 21, which can not only make the connection between the stroller frame 10 and the supporting frame 20 more stable, and can also prevent the supporting frame 20 from directly acting on the stroller frame 10 during sliding, thereby prolonging the service life of the stroller frame 10, so as to avoid damage to the stroller frame 10 due to friction. It would be understood, the first direction and the second direction are perpendicular to each other, moreover, the first direction is a direction perpendicular to the supporting surface, and the second direction is a direction parallel to the supporting surface. Furthermore, the supporting surface may be the ground.

Referring to FIGS. 3 to 5, in some optional embodiments, one end of the mounting member 24 is provided with a mounting part 241 for the mounting rod 23 to pass through and be mounted therein. The mounting part 241 protrudes out of the mounting member 24, and is provided with a hole for the mounting rod 23 to pass through. One end of the mounting rod 23 is provided with a fixing part 231 having a width greater than a diameter of the mounting rod 23. The mounting rod 23 passes through the mounting part 241 and is engaged with the mounting part 241 of the mounting member 24 through the fixing part 231. By the arrangement of the fixing part 231, the mounting rod 23 may be prevented from being detached from the mounting member 24 while the mounting rod 23 is moving. In addition, the fixing part 231 of the mounting rod 23 is provided with a mounting hole 232, and the mounting member 24 is provided with a first through hole 242. The first through hole 242 is close to the mounting part 241. The stroller frame 10 is provided with a second through hole 102 which is coaxial with the first through hole 242. The mounting member 24 is further provided with a connecting member which sequentially passes through the mounting hole 232, the first through hole 242 and the second through hole 102, and fixes the mounting rod 23 and the mounting member 24 to the stroller frame 10, and meanwhile makes the connection between the mounting rod 23 and the mounting member 24 more stable. It would be understood, the connecting member may be a screw arbor or the like. The screw arbor passes through the mounting hole 232, the first through hole 242 and the second through hole 102, and is fastened by a nut, and the structure is simple and stable. The standing plate 30 is mounted on the stroller frame 10 by the mounting member 24, and the mounting rod 23 is mounted on the mounting member 24 and connected to the fixing member 21, such that when a force is applied on the standing plate 30, the mounting rod 23, the fixing member 21 and the supporting frame 20 all receive the force from the standing plate 30.

Referring to FIGS. 3 to 5, in some optional embodiments, the resetting member 22 includes a spring structure, and the stretching member 25 may be a tension spring. The resetting member 22 of the spring structure is located between the protrusion part 211 of the fixing member 21 and the limit nut 234. When a force is applied on the standing plate 30, it acts on the spring through the protrusion part 211 of the fixing member 21, such that the spring is compressed between the protrusion part 211 and the limit nut 234. After the force on the standing plate 30 is removed, the spring can rebound quickly. In this embodiment, the tension spring has a first end 251 and a second end 252. The first end 251 is detachably arranged on the supporting frame 20, and the second end 252 is connected to the stroller frame 10. A positioning member 26 is arranged on the supporting frame 20 for engaging the first end 251. The middle portion of the positioning member 26 is an engaging portion with a smaller diameter, and the first end 251 is engaged in the engaging portion.

Figure 6:
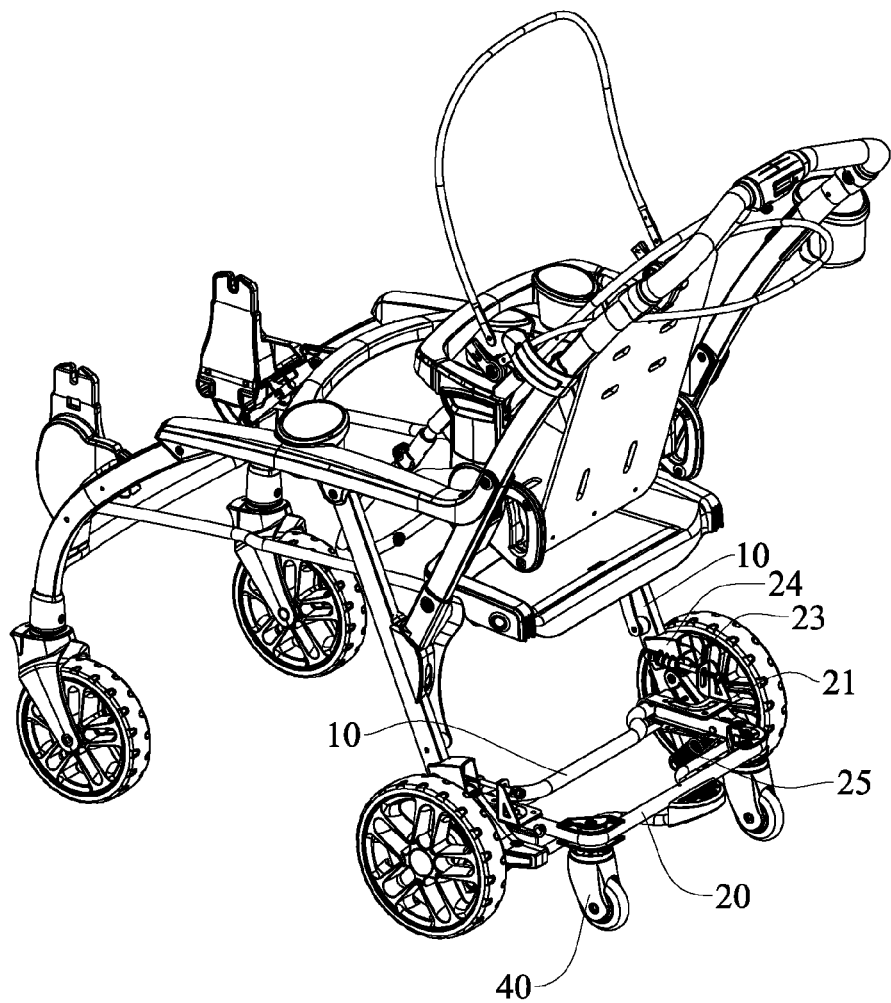
FIG. 6 is a schematic structural view of another embodiment of the disclosure.
Figure 7:
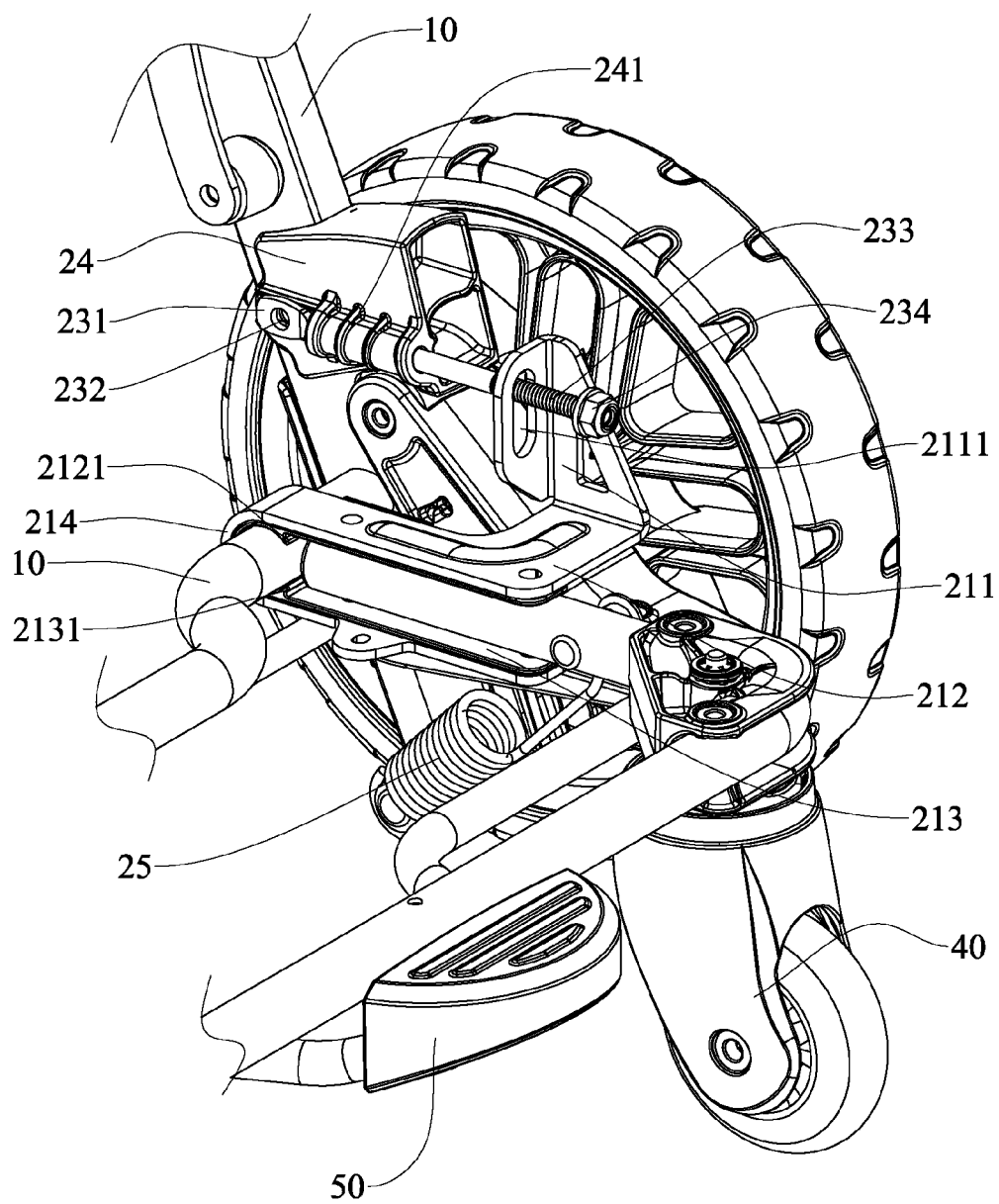
FIG. 7 is a schematic partial structural view of the connection between the supporting frame and the stroller frame in FIG. 6.

Referring to FIGS. 6 and 7, in some optional embodiments, there is no resetting member 22 arranged between the supporting frame 20 and the stroller frame 10. In order to make the overall structure of the supporting frame 20 and the stroller frame 10 more stable, the stretching member 25 is arranged under the supporting frame 20 and the stroller frame 10. Under the action of the stretching force of the stretching member 25, the wheel 40 always contacts the supporting surface, such that the wheel 40 and the supporting surface always move in friction in relative to each other and generate noise. If the stretching member 25 is arranged above the supporting frame 20 and the stroller frame 10, at this time, the stretching member 25 would play a role corresponding to the resetting member 22, and the stretching member 25 would apply an upwardly stretching force, which may not only avoid shaking between the supporting frame 20 and the stroller frame 10, but also play a role of lifting the supporting frame 20, so as to bring the wheel 40 to rise and thus avoiding noise generated by the friction between the wheel 40 and the supporting surface.

As shown in FIGS. 1 to 5, in the noise reduction structure 101 according to the disclosure, the elastic resetting member 22 is arranged between the stroller frame 10 and the supporting frame 20, and the resetting member 22 resets to bring the supporting frame 20 to move upward, and then the supporting frame 20 brings the wheel 40 to rise so as to avoid the friction between the wheel 40 and the supporting surface to generate noise. The standing plate 30 is arranged on the supporting frame 20 for a child or children to stand on, and the wheel(s) 40 is arranged on the bottom of the supporting frame 20 for auxiliary support and for sliding. When a child stands on the standing plate 30, or a heavy object is placed on standing plate 30, the force applied on the standing plate 30 will act on the supporting frame 20, and drives the wheel 40 moving downward to contact the supporting surface to slide, so the wheel 40 may play a role of supporting and sliding. The elastic resetting member 22 is arranged between the supporting frame 20 and the stroller frame 10. Accordingly, when the force on the standing plate 30 is removed, the resetting member 22 may bring the supporting frame 20 to perform an upward resetting movement, thereby brining the wheel 40 to rise, and thus avoiding noise generated by friction between the wheel 40 and the supporting surface when the standing plate 30 is unloaded. Furthermore, a locking member 50 is additionally arranged at one end of the supporting frame 20 away from the stroller frame 10, the locking member 50 may be used for locking the carrier 100 to prevent the carrier 100 from sliding. The noise reduction structure 101 according to the disclosure is simple in structure, and by additionally arrange a resetting member 22 between the supporting frame 20 and the stroller frame 10, the supporting frame 20 always has a resetting tendency, that is, when the standing plate 30 is unloaded, the resetting member 22 may lift the supporting frame 20 up and bring the wheel 40 to rise, so as to avoid the friction between the wheel 40 and the supporting surface to generate noise while the wheel 40 is suspended.

What disclosed above are only preferred embodiments of the disclosure, and the scope of the disclosure certainly cannot be limited by this. Therefore, any equivalent changes made according to the scope of the disclosure still belong to the disclosure.

REFERENCE NUMERAL LIST

100: carrier;
101: noise reduction structure;
10: stroller frame;
102: second through hole;
20: supporting frame;
21: fixing member;
211: protrusion part;
2111: through slot;
212: top wall;
2121: first limit block;
213: bottom wall;
2131: second limit block;
214: side wall;
22: resetting member;
23: mounting rod;
231: fixing part;
232: mounting hole;
233: threaded part;
234: limit nut;
24: mounting member;
241: mounting part;
242: first through hole;
25: stretching member;
251: first end;
252: second end;
26: positioning member;
30: standing plate;
40: wheel;
50: locking member.

What is claimed is:

1. A noise reduction structure comprising:
a stroller frame;
a supporting frame connected to the stroller frame;
a wheel mounted on the supporting frame, the supporting frame receives a force so that the wheel mounted on the supporting frame contacts a supporting surface to slide; and
an elastic resetting member arranged between the supporting frame and the stroller frame, the elastic resetting member biasing the supporting frame away from the supporting surface, so that upon cessation of the force the supporting frame automatically raises the wheel to avoid friction between the wheel and the supporting surface and to avoid generating noise.

2. The noise reduction structure according to claim 1, wherein an elastic stretching member is also arranged between the stroller frame and the supporting frame, the elastic stretching member has a first elastic force to downwardly stretch the supporting frame, such that the wheel mounted on the supporting frame moves downward and contacts the supporting surface.

3. A noise reduction structure comprising:
a stroller frame;
a supporting frame connected to the stroller frame;
a wheel mounted on the supporting frame, the supporting frame receives a force so that the wheel mounted on the supporting frame contacts a supporting surface to slide;
an elastic resetting member biasing the supporting frame away from the supporting surface, so that the supporting frame raises the wheel to avoid friction between the wheel and the supporting surface and to avoid generating noise; and
an elastic stretching member arranged between the stroller frame and the supporting frame, the elastic stretching member has a first elastic force configured to force the supporting frame downward towards the supporting surface;
wherein the elastic resetting member has a second elastic force greater than the first elastic force, such that upon cessation of the force on the supporting frame the second elastic force automatically biases the wheel to raise and avoid contact with the supporting surface.

4. The noise reduction structure according to claim 1, wherein a standing plate is also arranged on the supporting frame, the standing plate receives a force and acts on the supporting frame, such that the wheel mounted on the supporting frame contacts the supporting surface to slide.

5. The noise reduction structure according to claim 4, wherein the standing plate is detachably mounted on the supporting frame.

6. The noise reduction structure according to claim 4, wherein a fixing member is arranged on the stroller frame for fixing the supporting frame.

7. The noise reduction structure according to claim 6, wherein a mounting rod is also arranged on the stroller frame, one end of the mounting rod is mounted on the stroller frame, and the other end of the mounting rod is connected to the fixing member.

8. The noise reduction structure according to claim 7, wherein the fixing member is provided with a protrusion part protruding in a first direction, a through slot is arranged on the protrusion part for the mounting rod to pass through, and the standing plate receive a force so that the fixing member slides along the mounting rod at the through slot.

9. The noise reduction structure according to claim 8, wherein an end of the mounting rod is positioned adjacent to the elastic resetting member and the end of the mounting rod is provided with a limit nut for limiting location.

10. The noise reduction structure according to claim 9, wherein the elastic resetting member passes through and is mounted on the mounting rod and is located between the limit nut and the fixing member, the standing plate receives a force so that the fixing member compresses the elastic resetting member.

11. The noise reduction structure according to claim 8, wherein a mounting member is arranged on the stroller frame for mounting the supporting frame, and one end of the mounting member is provided with a mounting part for the mounting rod to pass through and be mounted.

12. The noise reduction structure according to claim 11, wherein an end of the mounting rod positioned adjacent the mounting member is provided with a fixing part, and the mounting rod is prevented from being separated from the mounting member in moving by the fixing part.

13. The noise reduction structure according to claim 11, wherein an end of the mounting rod positioned adjacent the mounting member is further provided with a mounting hole, the mounting member is provided with a first through hole being positioned adjacent to the mounting part, the stroller frame is provided with a second through hole being coaxial with the first through hole, and wherein the mounting rod and the mounting member are configured to be fixed to the stroller frame through the mounting hole, the first through hole, and the second through hole.

14. The noise reduction structure according to claim 6, wherein the fixing member is further provided with a connecting part for connecting the stroller frame and the supporting frame, the connecting part includes a top wall and a bottom wall being arranged opposite to each other, the top wall and the bottom wall are connected to each other by a side wall, the side wall is arranged in a curved surface, and the stroller frame is mounted between the top wall and the bottom wall and abuts against the side wall.

15. The noise reduction structure according to claim 14, wherein the supporting frame is mounted between the top wall and the bottom wall along a second direction and protrudes out of the fixing member.

16. The noise reduction structure according to claim 14, wherein an end of the top wall positioned adjacent the side wall is provided with a first limit block for limiting a sliding of the supporting frame in a second direction, and an end of the bottom wall positioned adjacent the side wall is provided with a second limit block for limiting the sliding of the stroller frame in the second direction.

17. The noise reduction structure according to claim 1, wherein the elastic resetting member includes a spring structure.

18. The noise reduction structure according to claim 2, wherein the elastic stretching member is a tension spring.

19. The noise reduction structure according to claim 1, wherein the stroller frame is a stroller frame for a hand cart, such as a baby stroller.

20. A noise reduction structure comprising:
a stroller frame;
a supporting frame connected to the stroller frame;
a fixing member is arranged on the stroller frame for fixing the supporting frame;
a mounting rod is arranged on the stroller frame, the mounting rod includes a first end coupled to the stroller frame and a second end coupled to the fixing member;
a wheel mounted on the supporting frame, the supporting frame receives a force so that the wheel mounted on the supporting frame contacts a supporting surface to slide; and
an elastic resetting member arranged between the supporting frame and the stroller frame, the elastic resetting member biasing the supporting frame away from the supporting surface, so that the supporting frame raises the wheel to avoid friction between the wheel and the supporting surface and to avoid generating noise;
wherein the second end of the mounting rod extends through the elastic resetting member;
and wherein the elastic resetting member is positioned between the fixing member and a limit nut.

* * * * *